United States Patent [19]
Korpi

[11] Patent Number: 5,292,217
[45] Date of Patent: Mar. 8, 1994

[54] QUICK FASTENER

[76] Inventor: John G. Korpi, 14399 Ramblewood, Livonia, Mich. 48154

[21] Appl. No.: 77,760

[22] Filed: Jun. 17, 1993

[51] Int. Cl.[5] .......................... F16B 21/00; F16B 35/04
[52] U.S. Cl. ................................... 411/553; 411/324; 411/419; 411/437
[58] Field of Search ................ 411/324, 418, 419, 420, 411/421, 437, 549, 551, 553

[56] References Cited

U.S. PATENT DOCUMENTS

| | | | |
|---|---|---|---|
| 1,957,784 | 5/1934 | Johnson | 411/324 |
| 3,351,966 | 11/1967 | Pelochino | 411/419 X |
| 4,451,190 | 5/1984 | Bellamy, Jr. et al. | 411/437 X |

FOREIGN PATENT DOCUMENTS 9006449  6/1990  World Int. Prop. O. .......... 411/553

*Primary Examiner*—Neill R. Wilson
*Attorney, Agent, or Firm*—Peter A. Taucher; David L. Kuhn

[57] ABSTRACT

Disclosed is a quick fastening quick releasing nut-and-bolt assembly in which the bolt has finger elements disposed along the bolt's longitudinal axis. The finger elements have sets of accurate thread segments matable with complimentary sets of radially inward facing arcuate thread segments on the inner diameter of a nut. The nut's inner diameter includes smooth semi-cylindrical surfaces circumferentially alternated with the nut's sets of thread segments. The nut has a central core body sliding upon radially inner surfaces of the finger elements so as to keep the finger elements in bearing relation with the nut's inner diameter. The assembly has a first, unlocked configuration in which the bolt's thread segments face the smooth surfaces on the nut's inner diameter. The assembly has a second, fastening configuration where the bolt's thread segments are engaged with the nut's thread segments.

9 Claims, 5 Drawing Sheets

QUICK FASTENER

GOVERNMENT USE

The invention described herein may be manufactured, used and licensed by or for the U.S. Government for governmental purposes without payment to me of any royalty thereon.

BACKGROUND AND SUMMARY

My invention lies within the art of threaded fastener construction and related to the art of high speed attachment devices.

More specifically, my invention is a quick-engagement fastener assembly in which a bolt or screw has finger elements extending away from a head. The finger elements have circumferentially spaced sets of arcuate thread segment matable with complimentary sets of radially inward facing thread 'segments of a nut or other internally threaded member. The nut's inner diameter has smooth semi-cylindrical surfaces circumferentially between the nut's sets of thread segments. In the nut is a generally cylindrical core body bearing against radially inner surfaces of the finger elements and holding the finger elements against the nut's inner diameter. In the fastener assembly's unlocked configuration, the bolt's thread segments can slide axially along the smooth surfaces on the nut's inner diameter. In the assembly's locked configuration, the bolt's thread segments engage the nut's thread segments and a lock device inhibits release of the ass, from the locked configuration.

DETAILED DESCRIPTION

Figure 1:
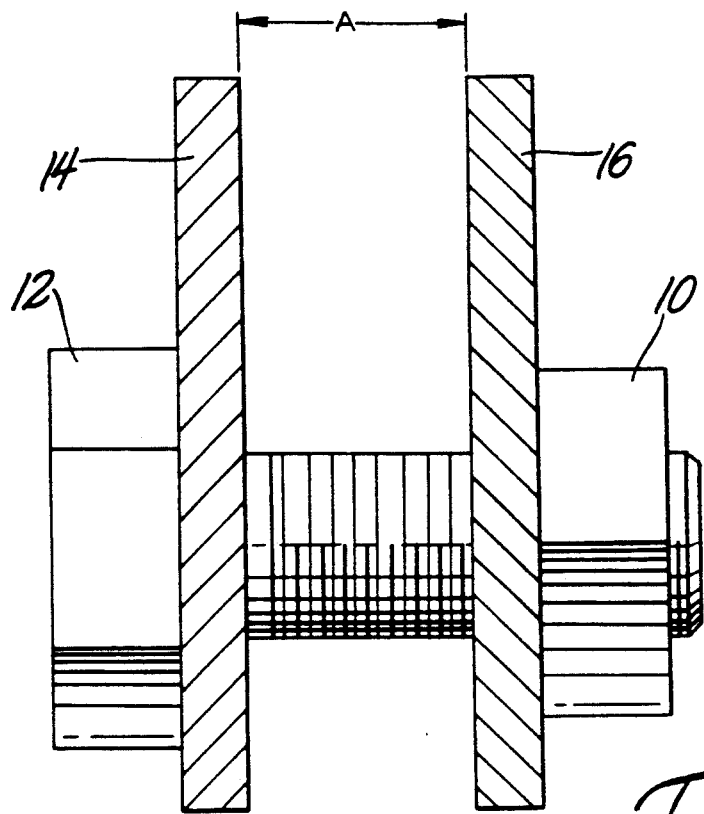
FIGS. 1 and 2 are depictions of a conventional nut and bolt used to fasten two plates together. For convenience, hidden lines are omitted in these figures.
Figure 2:
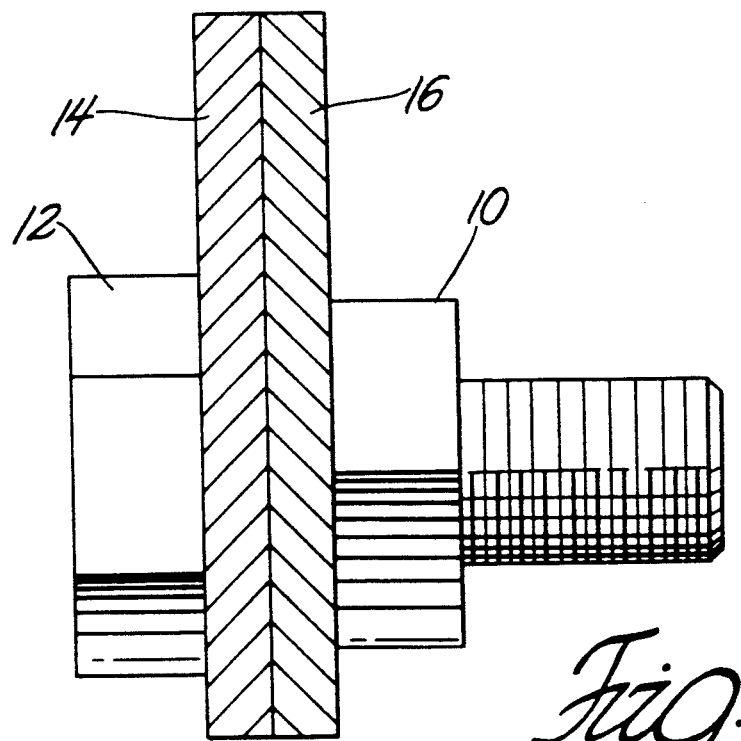
Figure 3:
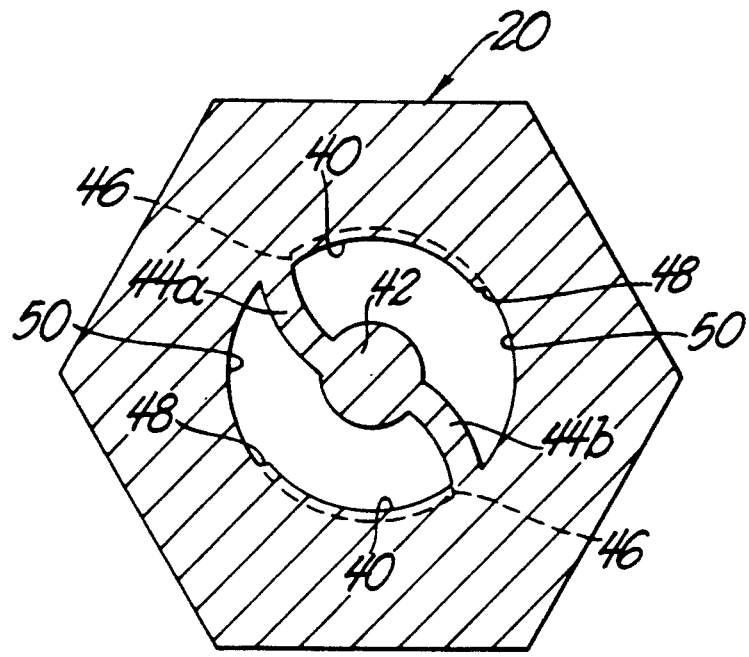
FIG. 3 is a sectional view of a specially configured nut partly threaded according to my invention.
Figure 4:
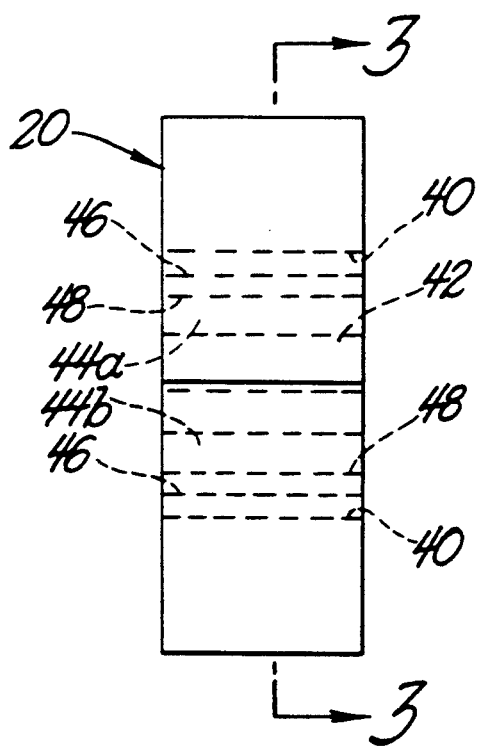
FIG. 4 is a side elevational view of the specially configured nut without hidden lines for internal thread segments.

FIGS. 1 and 2 show conventional nut 10 and bolt 12, which are used to fasten plates 14 and 16 together. One must rotate nut 10 many turns to move plate 16 a distance "A" from its FIG. 1 position to its FIG. 2 position, where plate 16 contacts plate 14. Of course, nut 12 can be replaced by a hole in plate 14 internally threaded to mate with the threads of bolt 10. My invention replaces bolt 12 with bolt 18 (FIGS. 5, 6 and 7) and replaces nut 10 with a female member such as modified nut 20 (FIGS. 3 and 4). The female member of my invention may also be a plate, boss or other mechanical member having a through bore.

Figure 5:
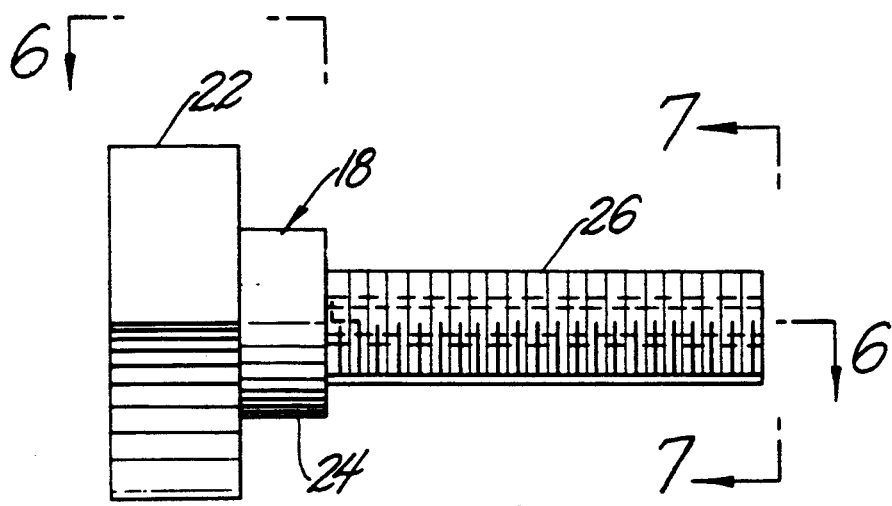
FIG. 5 is a side elevational view of a partly threaded bolt made according to my invention.
Figure 6:
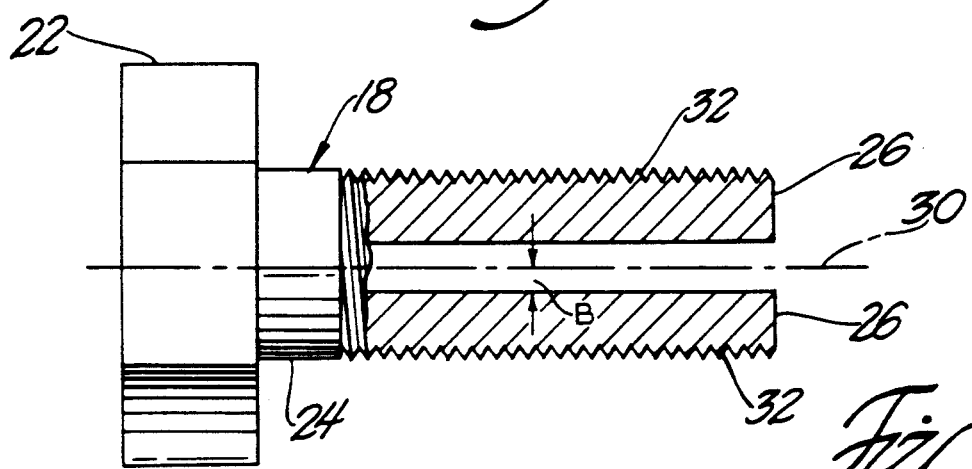
FIG. 6 is a view taken along line 6—6 in FIG. 5.
Figure 7:
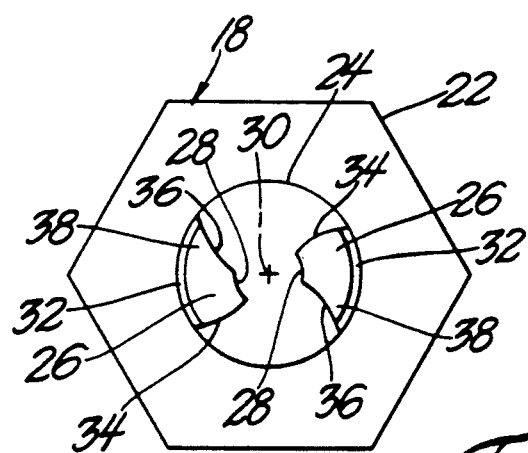
FIG. 7 is a view taken along line 7—7 in FIG. 5.

In FIGS. 5, 6 and 7, bolt 18 has a conventional hexagonal head 22 as well as conventional land 24 but has a novel shaft structure comprised of two elongate finger elements 26 along longitudinal axis 30 of bolt 18. Finger elements 26 each have a smooth, semi-cylindrically curved radially inner surface 28 concentric with axis 30. Elements 26 have sets of arcuate parallel thread segments 32 disposed at the fingers' radially outer peripheries concentric with axis 30. Thread segments 32 normally have an angular dimension of 90 degrees or less and have a pitch similar to that of conventional bolt threads. As best seen in FIG. 7, finger elements 26 have leading walls 34 at leading ends of thread segments 32. These leading ends are the first parts of segments 32 to engage nut thread segments 40 on nut 20 (FIG. 3) when the nut and bolt are threaded together. Finger elements 26 also have trailing walls 36 that form tapers 38 with the radially outer peripheries of the fingers. The portion of the fingers' radially outer peripheries at tapers 38 can be further from axis 30 than the remainder of the fingers' outer peripheries, say, by 5 to 10 thousandths of an inch. This lets zones of thread segments 32 at the tapers interferingly engage nut thread segments 40. Consequently, the sharp tips of the bolt's thread segments 32 at tapers 38 tend to dig into the nut's thread segments 40 as bolt 18 turns relative to nut 20, clockwise in FIG. 7, to unthread from nut 20. The sharp tips of segments 32 may perhaps be regarded as acting as pawls fashion when they deter unintended release of bolt 18 from nut 20.

FIGS. 3 and 4 show nut 20 configured to engage bolt 18. On the inner diameter of nut 20 are two sets of arcuate parallel thread segments 40 pitched similarly to threads of conventional nuts. Each thread segment 40 has a leading end 48 and a trailing end 46 normally spaced apart by 90 degrees or less. At the center of nut 20 is a generally cylindrical core body 42 having curved walls 44a, 44b radiating therefrom to the inner diameter of nut 20, the radially outer ends of these walls being at trailing ends 46. Core body 42 bears conformingly and slidingly against surfaces 28 of the bolt's finger elements 32 when bolt 18 and nut 20 are engaged. On the inner diameter of nut 20 are smooth semicylindrical surfaces 50 disposed angularly between leading edges 48 and outer zones of walls 44a, 44b.

Figure 8:
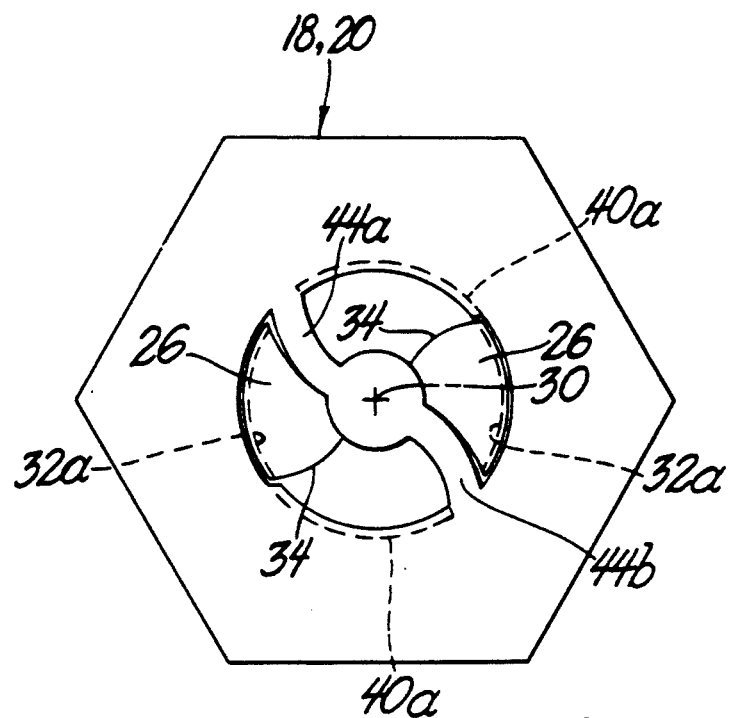
FIG. 8 is an end view of the assembly of my nut and bolt in an unthreaded configuration.
Figure 9:
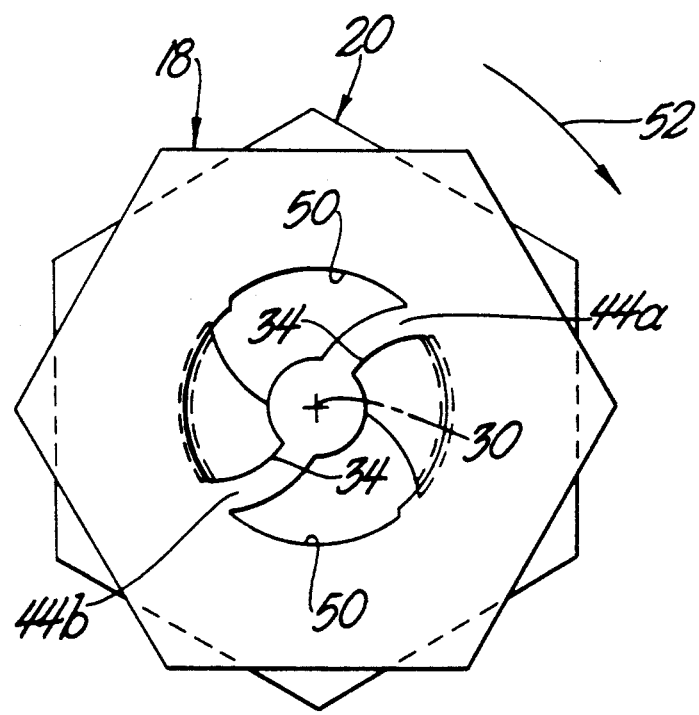
FIG. 9 is an end view of the assembly of my nut and bolt in a threaded configuration.

Surfaces 50, and the portions of the, walls 44a, 44b and core body 42 opposed thereto closely receive finger elements 26 so that nut 20 may be slid onto and along the finger elements to any selected position on the finger elements. The close receipt of finger elements 26 between walls 44 and surfaces 50 is shown in FIG. 8, wherein hidden lines 32a and 40a represent the bases of respective thread segments 32 and 40. FIG. 9 shows nut 20 on bolt 18 after nut 20 has been rotated in direction 52 on bolt 18 to achieve threading between the nut and bolt. Noted that leading walls 34 of finger elements 26 conformingly bear against walls 44a and 44b of the nut.

Referring again to FIG. 6, finger elements 26 can diverge slightly from longitudinal axis 30 and thus also from each other, the divergence increasing in a direction away from head 22. Typically the angle of divergence "B" between either element 26 and axis 30 will be between 1.0 and 5.0 degrees. The angle of divergence can be as small as zero degrees, where elements 26 are parallel, or it can be in excess of 15.0 degrees, depending upon the materials used for bolt 18. The divergence of elements 26 would cause bolt thread segments 32 to interferingly engage surfaces 50 when nut 20 is slid axially onto bolt 18.

Figure 11:
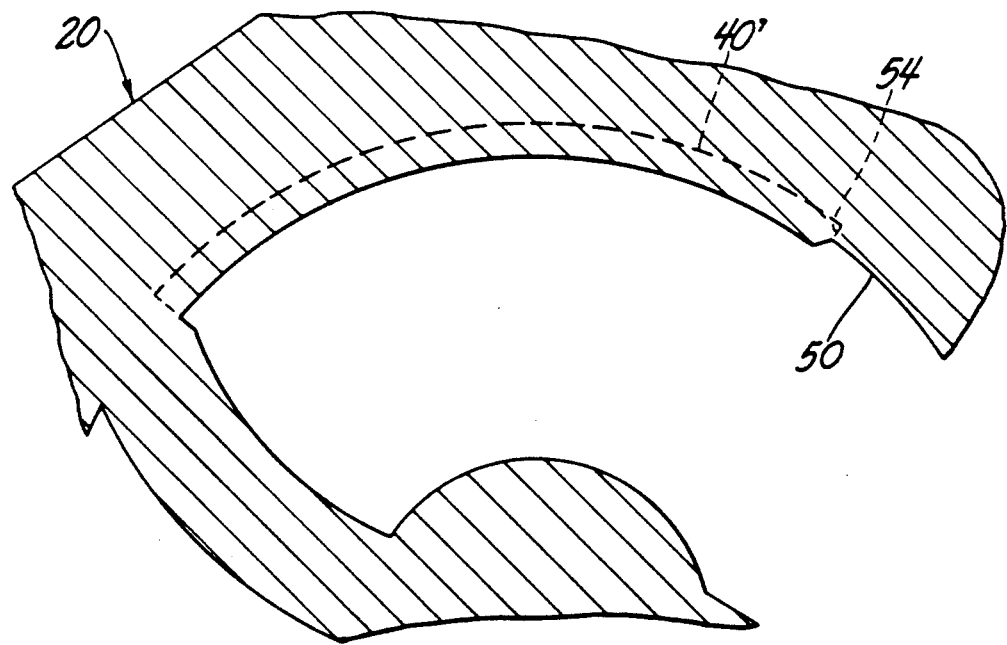
FIG. 11 is a detail view of a modified nut thread segment.

In conjunction with the diverged finger elements 26, nut thread segments 40 may be modified as shown at 40' in the FIG. 11 detail view. Thread segment 40' has the same radial depth and is otherwise the same as a thread segment 40 except that the base of thread segment 40' (represented by the arcuate broken line in FIG. 11, is recessed with respect to surface 50 whereas the base of thread segment 40 (FIG. 3) is not BO recessed. In other words, segment 40' is radially more outward than segment 40. In the FIG. 9 position of the nut and bolt, the recessing or greater radial outward distance of thread segment 40' lets finger elements 26 springingly diverge from their radially compressed, FIG. 8 position, where they interferingly engage surface 50. Between the base of thread segment 40' and surface 50 is shoulder 54, which engages taper 38 if the bolt and nut are in the FIG. 9 position and one attempts to unscrew the nut from the bolt.

Figure 12:
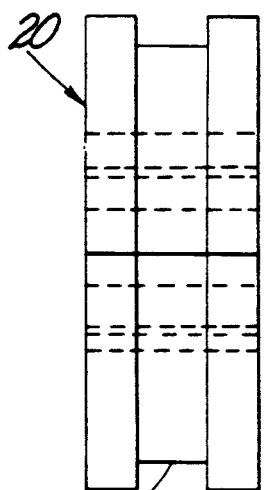
FIG. 12 is a side elevational view of the nut showing an optional modification thereto, hidden lines representing internal nut thread segments being omitted for convenience.
Figure 10:
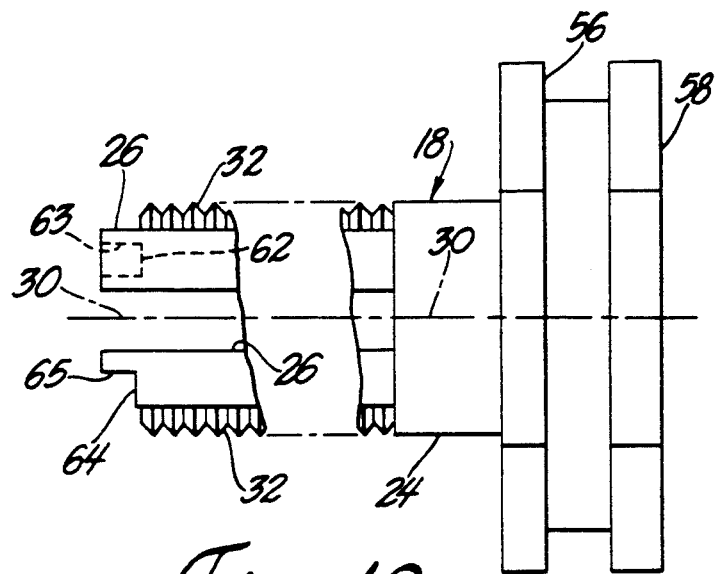
FIG. 10 is a side elevational view of the bolt showing optional modifications thereto.

FIG. 10 shows an optional modification to bolt 18 wherein annular recess 56 is defined by hexagonal bolt head 58. Recess 56 allows a hand gripping tool such as a pair of pliers to grip head 58 when manually sliding bolt 18 through nut 20 while bolt thread segments 32 frictionally or interferingly engage the nut's semi-cylindrical surface 50. Additionally, nut 20 may be modified to have an annular recess 60 in FIG. 12, which is similar to recess 56. Referring again to FIG. 10, the free ends of legs 26 may be provided either with a blind bore as at 62 or a step as at 64. The radially outward surfaces 63 and 65 respectively of the bore or step are closer to axis 30 than thread segments 32 and face radially outward, away from axis 30. Surfaces 63 and 65 can be used as grasping points for squeezing finger elements 26 together to facilitate disengagement of bolt thread segments 32 from nut thread segments 40'.

I wish it to be understood that I do not desire to be limited to the exact details of construction shown herein since obvious modifications will occur to those skilled in the relevant arts without departing from the spirit and scope of the following claims.

I claim:

1. A fastener assembly comprising
   a head;
   a longitudinal axis;
   finger elements extending from the head along the axis;
   a first set of thread segments on radially outer portions of the finger elements;
   first curved surfaces on radially inner portions of the finger elements;
   a specially configured female member engaged to the finger elements;
   second sets of thread segments on an inner diameter of the female member, the second sets threadingly complimentary to the first sets;
   second curved surfaces on the inner diameter of the female member between the second sets of thread segments;
   a core body at the center of the female member, the body having third curved surfaces upon which slide the first curved surfaces;
   internal means for both allowing limited angular relative mobility between the finger elements and the inner diameter and for affixing the core body within the female member, the internal means comprised of internal members extending from the core body to the inner diameter.

2. The fastener assembly of claim 1 wherein the assembly has a first configuration in which the first sets of thread segments engage the second sets of thread. segments and a second configuration where the first sets of thread segments engage the second curved surfaces, the fastener further having mechanical means to inhibit the assembly from moving from the first configuration to the second configuration.

3. The assembly of claim 2 wherein the mechanical means comprises:
   a trailing wall on one of the finger elements connected between the first set of thread segments and the first curved surface of the one finger element;
   a tapered zone bordered by the trailing wall and the first set of thread segments of the one finger element;
   an edge on the tapered zone engaging the inner diameter of the female member during the first configuration so as to inhibit rotation in one direction of the one finger element with respect to the inner diameter of the female member.

4. The assembly of claim 2 wherein:
   the finger elements in a free state diverge from one another in a direction away from the head;
   the finger elements are elastically depressed toward each other during the first configuration, whereby the finger elements interferingly engage the second curved surfaces of the female member;
   the second sets of thread segments are at least partly recessed with respect to the second curved surfaces, whereby the finger elements are more diverged during the second configuration than during the first configuration.

5. The assembly of claim 2 wherein the head has a generally polygonal shape and includes a plurality radially facing head sides, the head defining a head zone recessed relative to at least one of the head sides.

6. The assembly of claim 5 wherein the free ends of the finger elements define radially outward facing surfaces disposed radially inward of the thread segments of the first sets.

7. The assembly of claim 2 wherein the female member has a generally polygonal shape and included a plurality of radially facing member sides, the female member defining a member zone recessed with respect to at least one of the member sides.

8. The assembly of claim 4 wherein:
   the head has a generally polygonal shape and includes a plurality of radially facing head sides, the head defining a head zone recessed with respect to at least one of the head sides;
   the female member has a generally polygonal shape and includes a plurality of radially facing member sides, the female member defining a member zone recessed with respect to at least one of the member sides;
   the free ends of the finger elements define radially outward facing surfaces disposed radially inward of the thread segments of the first sets.

9. The assembly of claim 3 wherein the edge is radially more outward than a remainder of the one finger element so that the portions of the thread segments of the first set at the edge digingly engage thread segments of the second set when the first and second set are angularly aligned.

* * * * *